United States Patent
Games

[11] 3,731,526
[45] May 8, 1973

[54] VARIABLE CENTER FREQUENCY FILTER

[75] Inventor: John E. Games, Granby, Conn.

[73] Assignee: United Aircraft Corporation, East Hartford, Conn.

[22] Filed: Aug. 5, 1971

[21] Appl. No.: 169,391

[52] U.S. Cl. ................... 73/71.4, 324/77 E, 235/186
[51] Int. Cl. ......................................................... G01d
[58] Field of Search ........................... 73/67, 69, 71.2, 73/71.4; 324/77 E; 235/186, 189

[56] References Cited

UNITED STATES PATENTS 3,277,695  10/1966  Joline ................................. 73/71.4
3,070,995  1/1963  Broder et al ........................... 73/67

*Primary Examiner*—James J. Gill
*Attorney*—Melvin Pearson Williams

[57] ABSTRACT

A system for analyzing the frequency response of apparatus such as rotary machinery includes a plurality of vibration sensors which are multiplexed to apparatus utilizing amplitude sensitive phase detection with a two phase clock operating at a selected frequency at which the analysis is to be performed. The two phase-detected waves are passed through vector solution apparatus which provides the summation of the rectified waves and a weighted rectified difference in the rectified waves. Various two phase clock controls and filters are disclosed.

4 Claims, 14 Drawing Figures

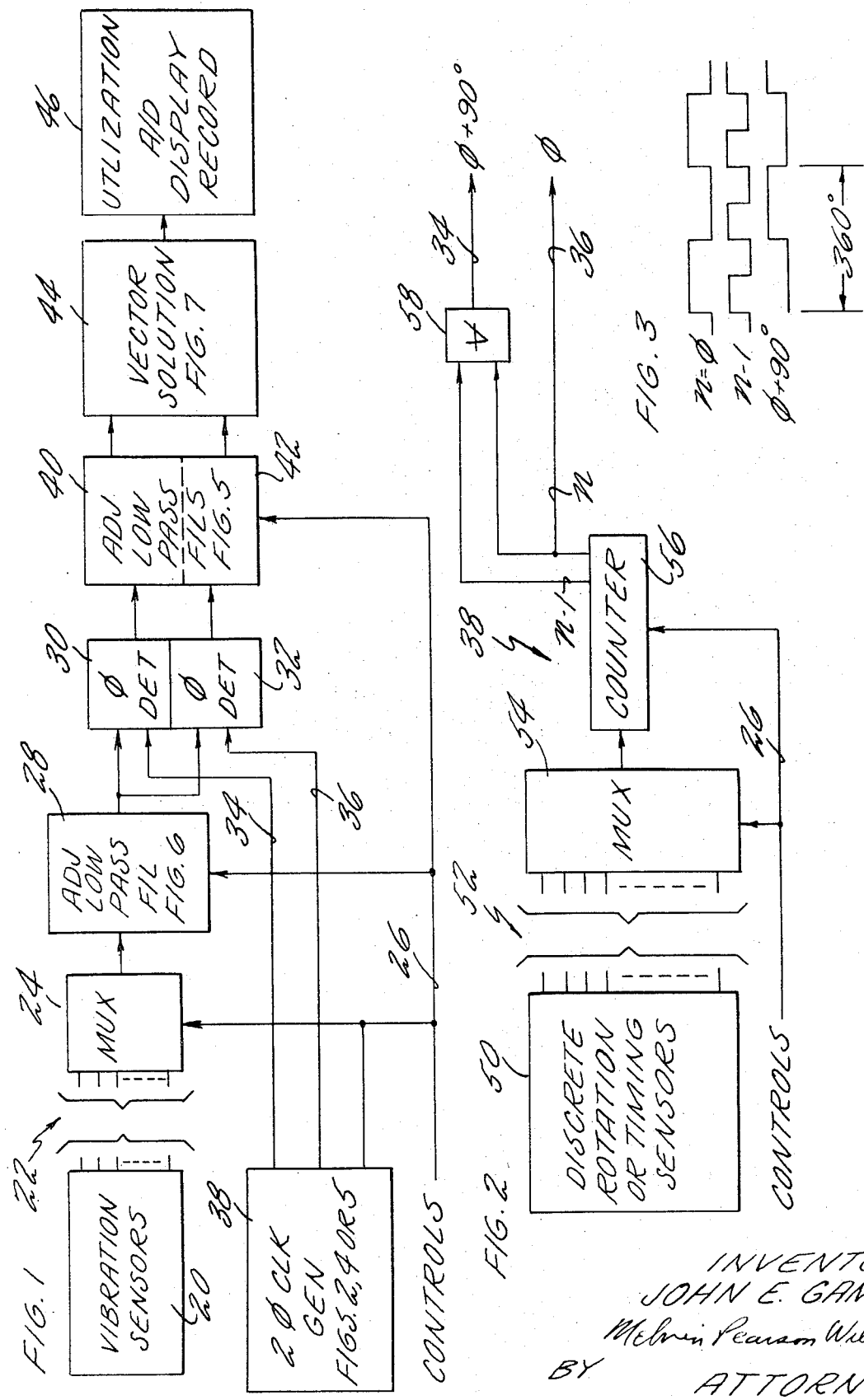

VARIABLE CENTER FREQUENCY FILTER

BACKGROUND OF THE INVENTION

1. Field of Invention

This invention relates to frequency analysis, and more particularly to improved apparatus for determining signal amplitudes within discrete frequency bands, singly, or in a spectral fashion.

2. Description of the Prior Art

A technique which has recently gained wide acceptance in the analysis of rotary machinery problems and in the trending of failure analysis for prognostics (that is, expected future behavoir of an engine or rotary machine) is the analysis of frequency responses of vibrations in both the normal and abnormal operations of rotary systems. As an example, consider the rotary components in an aircraft jet engine; modern jet engines include a pair of spools, one at a higher speed than the other. To analyze conditions in such an engine, it is therefore required that the analyzing equipment be fully operable at a wide range of cyclic speeds (that is, the frequency response being monitored must be adjustable over a wide range). However, due to the large amount of spurious noise and harmonics which can appear in any signal line, or which can, for that matter, be generated within the signal monitoring equipment itself, it is necessary to severely limit the bandwidth of the analyzing apparatus so as to ensure that the effects being noted are at the frequency which is desired to be analyzed. Naturally, if the different frequencies are not separable, then the independent effects of each cannot be properly analyzed: for instance, if the bandwidth of the system is too wide, then effects in the low speed portion of a jet engine may show up as harmonics during the analysis of the high speed portion.

The digital filtering techniques require an identification of the particular frequency desired; in most cases, the phase of a standard frequency cannot be adjusted to the phase of the unknown being monitored, and may in fact be 90° out of phase and therefore result in a nullity in phase detection circuitry, showing no response whatsoever at a given frequency when in fact a large response could be present. For this reason, it is common to use an in-phase and quadrature mixing of the unknown frequency component followed by a solution of the vector sum of the two components.

In order to provide vibrational analysis in rotary machinery, systems have been developed which employ a multiplicity of analog filters together wit digital or other precise switching control to employ the analog filters selectively, one at a time, for the purpose of selecting given frequencies of response to be analyzed; or such systems may employ a plurality of registers operating in parallel, each register relating to a given filter. However such equipment becomes extremely cumbersome, the more particularly so when a wide range of individual frequency response bands need be analyzed.

Other techniques which have been utilized on a laboratory or test bench basis may employ adjustable filters, perhaps of the digital type, but such systems require complex vector solution calculation equipment in order to determine an amplitude at a given frequency. In such systems, harmonics can become an extremely important problem, in that it is impossible to determine if a given signal is a desired signal at the indicated frequency and amplitude, or if it is an odd harmonic of that frequency reduced from its original amplitude by the number of the harmonic (say one third of a third harmonic response).

In performing vibration analysis of machinery, there are a number of ways that the response to the system can be analyzed. For instance, a given frequency, usually relating to the primary rotary frequency of a given portion of the machine, can be selected and the response in a narrow band surrounding that frequency can be monitored. This is known as a correlation technique: the relationship between the response noted within the related band is taken to correlate to the primary frequency about which the band is centered, which relates to a mechanical parameter of the system. For instance, imbalance in a jet engine rotor can result in a high incidence of vibration energy in a narrow band surrounding the primary rotation rate of the rotor.

Another method employs power density spectrum analysis wherein the complete signature of vibrations at a large number of discrete bands may be simultaneously recorded (or nearly simultaneously, within a short time span, such as a few seconds). This gives a complete analysis of the "white noise" of the system and may be compared in an unknown machine against either a statistical sampling of similar noise from good machines, or, the signature of a good machine could have been previously recorded for comparison with its signature taken during maintenance operations at a later date. In any event, in this method, it is required that a large number of bands be established over a relatively short period of time (either in parallel or serially) so as to capture the entire spectrum in discrete bands. Thus, frequency scanning of the noise characteristics of a machine may be required.

SUMMARY OF INVENTION

Objects of the invention include provision of improved and simplified frequency response analysis apparatus.

According to the present invention, in-phase and quadrature signals, at a frequency at which the amplitude of response of an unknown signal containing responses at a wide range of frequencies is to be analyzed, are compared with the unknown signal in an amplitude-sensitive phase detector, such as a synchronous demodulator, to provide quadrature-related first and second signals, the vector sum of which provides the amplitude at the desired frequency by means of summation of the absolute magnitudes of the outputs and a weighted absolute magnitude of the difference between them. More specifically, in the present invention, quadrature-related outputs of a pair of synchronous demodulators are full-wave rectified, the difference taken and rectified, and a weighted function of the rectified difference is then added to each of the full-wave rectified quadrature-related signals, in an ordinary voltage summing network. This gives a close approximation to the solution of the vector sum of the quadrature-related outputs from the synchronous demodulators.

In accordance with other aspects of the present invention, programmable low pass filters are utilized to provide an upper response limit to the circuitry herein to eliminate unwanted harmonics from being monitored; the quadrature signals at each desired frequency of analysis may be provided by a two-phase, square-wave clock generator which is controllable either by a sensed cyclic event in the system being analyzed (such as a tachometer), with or without frequency division so as to relate it to a desired primary frequency, or by a scanning frequency generator, which in accordance with another aspect of the present invention, may comprise a time-incremented counter feeding a digital/analog converter and a square wave, voltage controlled oscillator.

The present invention provides simple and reliable circuitry, having an extremely low weight and size factor and therefore suitable for use in airborne equipment, which is capable of providing a wide range of frequency analysis operations in adjustable bands over selectible or scannable primary frequencies.

Other objects, features and advantages of the present invention will become more apparent in the light of the following detailed description of preferred embodiments thereof as illustrated in the accompanying drawing.

BRIEF DESCRIPTION OF THE DRAWING

FIG. 1 is a simplified schematic block diagram of an exemplary system for frequency analysis in accordance with the present invention;

FIG. 2 is a simplified schematic block diagram of a two-phase clock generator which may be employed in the exemplary system of FIG. 1 in accordance with one embodiment of the invention;

FIG. 3 is an illustration of the operation of the two-phase clock generator of FIG. 2;

DESCRIPTION OF THE PREFERRED EMBODIMENT

Figure 4:
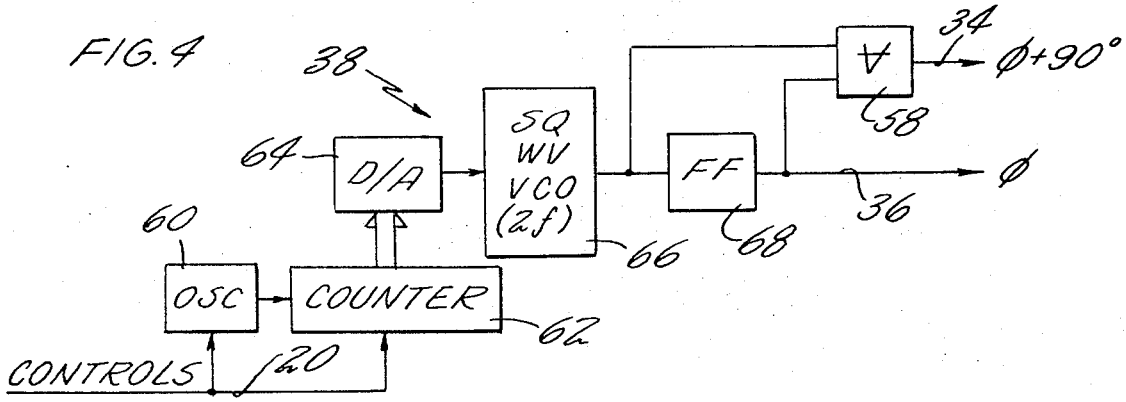
FIG. 4 is a simplified schematic block diagram of a two-phase clock generator which may be employed in the exemplary system of FIG. 1 in accordance with a second embodiment of the invention.

Referring now to FIG. 1, an exemplary system incorporating various aspects of the present invention includes functional blocks, the details of which are illustrated in other figures herein and described hereinafter. A plurality of vibration sensors 20 may, in a typical utilization of the present invention, be disposed at critical locations on apparatus, such as a piece of machinery, the frequency response of which is to be analyzed for maintenance or diagnostic purposes. The sensors may comprise accelerometers or velocity sensors, as desired, in dependence upon the type of localized response which it is desired to analyze at a given point in the machine. Such devices are well known and are in wide use in vibration analysis equipment currently available in the art. The vibration sensors 20 may be provided suitable connections 22 to multiplexing apparatus 24 which will select the output of one of the sensors 20 in response to control signals applied thereto by suitable control lines, indicated diagramatically in FIG. 1 as a control line 26. The multiplexer will provide a signal having a complex waveform, containing the entire response to the selected one of the vibration sensors 20, to an adjustable low pass filter 28, which may be of the type illustrated in FIG. 6 and described hereinafter, or any other suitable type, in dependence upon the particular utilization of the various aspects of the present invention. Basically, the low pass filter 28 is provided so as to limit the frequency response of the system of FIG. 1 to frequencies below any harmonic of any particular or given frequency at which an analysis is to be made. The reason for this is that if an odd harmonic of the frequency being analyzed is present in the system, it can appear at the analysis frequency as a signal one third as great as its true amplitude, which of course will provide an erroneous indication of the amplitude of true signals at the desired frequency. Thus, if a machine is deemed to have frequencies of interest ranging between say 100 Hz and 300 Hz the low pass filter would normally be first adjusted to have a cut off frequency above 100 Hz, while significantly attenuating frequencies above 300 Hz. As th analysis proceeds, the cut off frequency would be stepped increasingly higher and finally have a cut off just in excess of 300 Hz, as the highest potential frequencies are analyzed. This type of filter is sometimes referred to as an "aliasing filter."

The output of the adjustable low pass filter 28 is applied to a pair of amplitude sensitive phase detectors 30, 32 which may preferably take the form of well known synchronous demodulators. Each of the phase detectors 30, 32 also receives a respective signal on a pair of lines 34, 36 from a two-phase clock generator 38 which provides quadrature-related signals on the lines 34, 36. The two-phase clock generator 38 may take any of the forms illustrated in FIGS. 2, 4 or 5 and described hereinafter, or any other suitable form to suit the detailed parameters of any utilization of the present invention. As is known, synchronous demodulators respond to a reference frequency (in this case provided by the two-phase clock generator 38) to develop nominal sum and difference output frequency signals. That means that the output is nominally the combination of very low frequency signals and a signal at approximately twice the reference frequency. The low frequency signal can be thought of as an output depending on the amplitude of and the variation in phase between a signal component at the reference frequency and the reference frequency signal itself, the nominal very low frequency (or difference) output has a time variation in it which is very slow in contrast with the reference frequency. The magnitude of the very low frequency output signal is a function of the amplitude of the unknown signal component which is detected in the synchronous demodulator at the frequency of the reference signal. In other words, the phase detectors 30, 32 operate to provide output signals having a magnitude proportional to the amplitude of the frequency component of the input signal which is at or near the frequency of the reference signals from the two-phase clock generator. In order to eliminate the frequency sum output (at approximately twice the reference frequency), the output of the phase detectors 30, 32 are applied to respective adjustable low pass filters 40, 42 which may be of the same general type as the low pass filter 28 (to be described hereinafter), but adjusted so as to set the pass band of the entire apparatus. For instance, in the case of rotary machinery being utilized herein as an example, the filters 40, 42 might be set to establish a system band pass in the nature of 6 Hz. The output of the filters 40, 42 are both applied to vector solution apparatus 44 which provides substantially the vector sum of the in phase and quadrature outputs of the filters 40, 42 as described more fully hereinafter with respect to FIG. 7. The output of the vector solution apparatus 44 is applied to suitable utilization means 46 which may include a display and recording means, and may also use analog to digital conversion, in any fashion which suits the purposes to which the present invention is put in accordance with well known teachings of the prior art.

Thus there has been described in FIG. 1 apparatus to receive signals from a selected one of a plurality of vibration sensors, to utilize quadrature related reference frequency signals to select a given frequency component of the input, and, through vector solution, to provide a single output signal indicative of the amplitude of the selected frequency component for suitable utilization. The remaining description herein is of components, illustrated in FIGS. 2–7, which may be incorporated within the exemplary system of FIG. 1 as just described.

Referring now to FIG. 2, the two-phase clock generator may be of a suitable form to respond to a selected one of a plurality of discrete rotation or timing sensors 50. As an example, such a sensor may comprise a tachometer on any of the independent spools of a jet engine, which sensor would be selected to be the appropriate one relating to the particular vibration sensor 20 (FIG. 1), the frequency response of which is to be analyzed. The sensors 50 are provided with suitable connections 52 to a multiplexer 54 which responds to the controls 26 to select the desired one of the sensors 50. The timing signal from the selected sensor is applied by the multiplexer 54 to a counter 56 which may be utilized to provide a desired countdown or division of input pulses, as necessary, to relate the output of the tachometer (or other discrete rotation or timing sensor 50 which has been selected by the multiplexer) to the base frequency which is desired to be analyzed. Thus, if a tachometer gives one output signal from each blade of a fan in a jet engine, and there are 48 blades, then division of the input signal by 48 is required of the counter 56. This may be achieved by utilizing a counter of a suitable size which can be preset each time it gives an output signal so that it will count from the preset value to its full value in the number of counts required for the divisional process. On the other hand, it may be provided with output decoding means to sense the counting from zero up to the desired count. This may be controlled by suitable signals on the control lines 26 in any number of well known ways. The output of the counter 56 is utilized to generate a pair of signals having a quadrature relationship (one signal delayed in phase from the other by 90°). In the embodiment of FIG. 2, the output of the highest-ordered utilization stage of the binary counter 56 (designated n) is taken as the in-phase output signal on the line 36. This is combined in an exclusive OR circuit 58 with the output of the next lower-ordered stage ($n-1$) so as to provide the quadrature signal on the line 34. This operation is illustrated in FIG. 3, wherein it can be seen that the output of the exclusive OR circuit (phase plus 90°) will coincide with those times where the $n$ and $n-1$ counter outputs are opposite, resulting in a wave which is similar to but delayed by 90° from the in-phase wave on the line 36. The circuit of FIG. 2 thus provides a selected discrete pair of quadrature-related timing signals which may be a submultiple of the output of any desired discrete rotation or timing sensor.

Another form which the two phase clock generator 38 may take is illustrated in FIG. 4. Therein, the quadrature related signals are altered from a low frequency, in stepwise fashion, to successively higher frequencies. This provides frequency control for the phase detectors 30, 32 in FIG. 1 in a scanning fashion which is useful in power density spectrum analysis wherein the response of a given sensor is determined over a wide range of frequency bands. In FIG. 4, an oscillator 60, or other suitable primary timing signal generator, provides a signal to increment a counter 62, the output of which is monitored and converted by a digital to analog conversion circuit 64 to provide an output signal to a square wave voltage controlled oscillator 66, the input signal level of which is a function of the setting in the counter 62. The oscillator 60 will operate at a very low frequency related to the rate at which the desired frequency to be analyzed is to be changed. In the system of FIG. 1, signals on the control lines 26 may control the multiplexer 24 and the low pass filter 28 as well as the two-phase clock generator 38 (as illustrated in FIG. 4) in such a fashion to sweep all desired frequencies for each selected one of the vibration sensors 20, and then select another vibration sensor and again sweep the frequencies; contrarywise, the controls may be arranged so that for any given selected frequency, each of the vibration sensors 20 are selected in turn by the multiplexer 24; and then the frequency is changed and all of the vibration sensors are again monitored through the multiplexer 24. This is immaterial to the present invention and may be adjusted to suit a particular design parameter of any utilization of the invention. In FIG. 4, for each output of the oscillator 60, the counter 62 will be incremented, and the digital to analog converter 64 will provide a higher output level in response to the counter 62 in stepwise fashion. This in turn will cause the square wave voltage controlled oscillator 66 to increase the frequency of its output by a proportional amount. In adjusting the parameters of the square wave voltage controlled oscillator 66, it should provide, for a given count in the counter 62, an output of twice the primary frequency desired. This is due to the fact that the in phase and quadrature signals are most readily generated in a fashion similar to that described hereinbefore with respect to FIG. 2 by utilizing the output of the square wave VCO 66 as the equivalent of the $n-1$ stage of the binary counter 56 (FIG. 2) and, by application through a suitable frequency halving device, such as a flip flop 68, produce the in-phase signal on the line 36 as one half of the output of the VCO 66. Again, the exclusive OR circuit 58 will provide a quadrature signal as illustrated in FIG. 3. Thus, the circuit of FIG. 4 provides a frequency sweeping or stepping capability which will provide a sequence of discrete frequencies in a stepwise fashion as a function of time.

Figure 5:
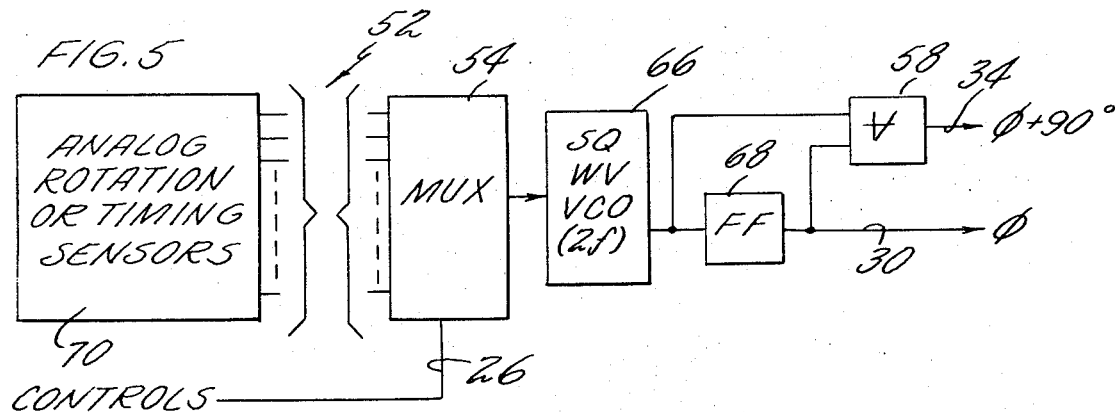
FIG. 5 is a simplified schematic block diagram of a two-phase clock generator which may be employed in the exemplary system of FIG. 1 in accordance with a third embodiment of the present invention.

Another form which the two-phase clock generator 38 may take is illustrated in FIG. 5. This is really a modification of the circuit of FIG. 2 which is more suitable for use with analog rotation or timing sensors 70. This type of sensor may comprise devices which provide a signal level indicative of a rate of rotation or a cyclic repetition rate of any sort. For instance, some tachometers provide DC signal levels indicative of the number of revolutions per minute, particularly for utilization in needle-gauge type displays. The sensors 70 are provided with suitable connections 52 to the multiplexer 54 so that the output signal of one of them is applied to the square wave VCO 66 which operates in the same fashion, together with the apparatus 58, 68 as described hereinbefore with respect to FIG. 4.

Figure 6:
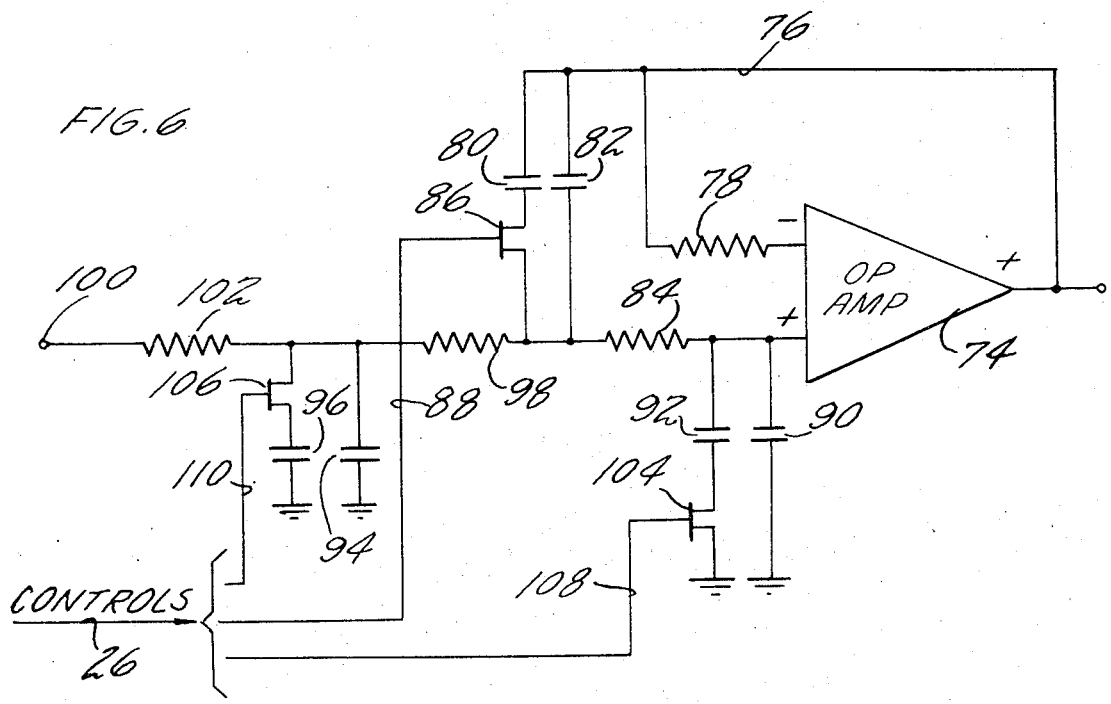
FIG. 6 is a simplified schematic diagram of an adjustable low pass filter which may be utilized in the exemplary system of FIG. 1.

The adjustable low pass filters 28, 40, 42 may take the form illustrated in FIG. 6. Therein, an operational amplifier 74 includes a feedback path 76 which provides negative feedback through a resistor 78 to an out-of-phase input to the amplifier 74. The feedback path 76 also is capacitively coupled to the in-phase input of the operational amplifier 74. Specifically, a pair of capacitors 80, 82 are coupled through a resistor 84 to the in-phase input of the amplifier 74. The capacitor 80, however, is not so coupled unless a field effect transistor 86 has a signal applied to the gate thereof over a line 88 in response to a suitable one of the control lines 26. In a similar fashion, a pair of capacitors 90, 92 are connected to the in-phase input of the operational amplifier 74 and a pair of capacitors 94, 96 are coupled through a resistor 98 and the resistor 84 to the in-phase input of the operational amplifier 74. The circuit of FIG. 6 has an input terminal 100 which is coupled through a resistor 102 and the resistors 98, 84 to the amplifier 74. The capacitors 92, 96 are each provided with a related field effect transistor 104, 106, respectively, which is operable by signals on related lines 108, 110 in response to suitable signals on the control lines 26. The adjustable low pass filter of FIG. 6 is designed so that the highest possible break point frequency (the highest permissible frequency to pass through the device) is set by means of the permanently connected capacitors 82, 90, 94. The other capacitors 80, 92, 96 are chosen to be of differing values so that selective utilization of any of them, in any combination with others of them, can provide additional frequencies in addition to the highest frequency of the device. This is achieved simply by providing suitable control signals on the lines 88, 108, 110. The filter of FIG. 6 is a three pole filter, and with the three FETs shown can provide two breakpoint frequencies. Of course, this design may be modified to include more sets of FETs if desired, and with proper combinational logic will provide $2^m$ breakpoints, where $m$ = number of 3-FET sets. It should be understood that the circuit of FIG. 6 is not a part of the invention hereof, but is merely illustrative of an adjustable low pass filter which is desirable for use in the exemplary system of FIG. 1. In addition, it is not necessary to have adjustability in the filters 40, 42 unless it is desired to be able to vary the bandwidth of the system; on the other hand, it is desirable to be able to limit the upper overall frequency response by means of the filter 28, to eliminate spurious effects of harmonics as described hereinbefore.

Figure 7:
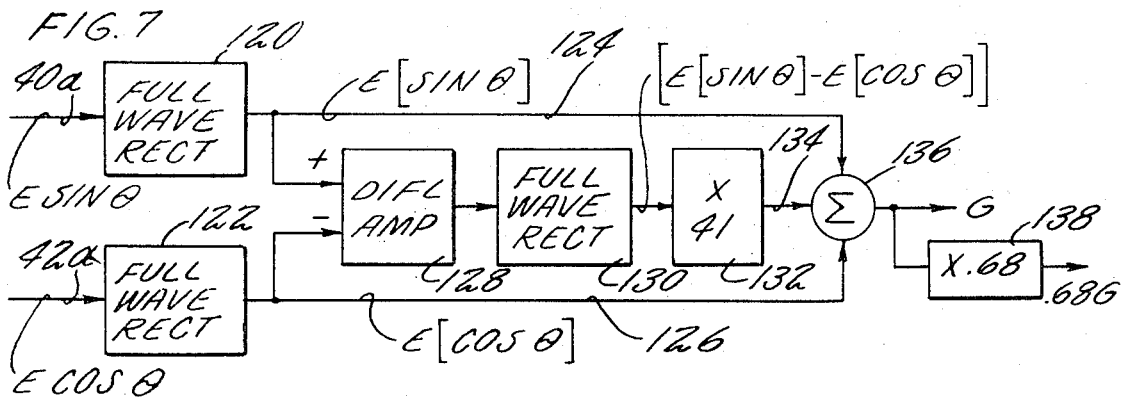
FIG. 7 is a simplified schematic block diagram of vector solution apparatus in accordance with the present invention.
Figure 8A:
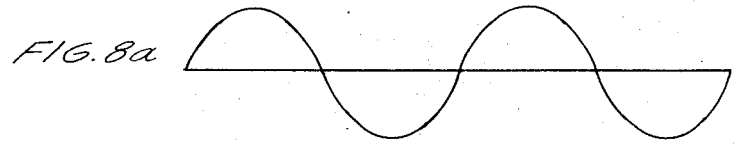
FIGS. 8a-8g are waveform illustrations relating to the operation of the vector solution apparatus of FIG. 7.
Figure 8B:
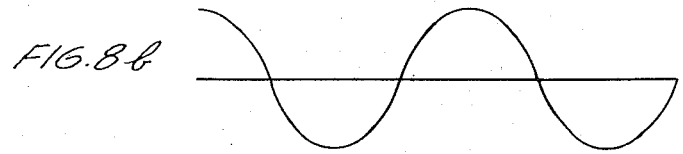
Figure 8C:
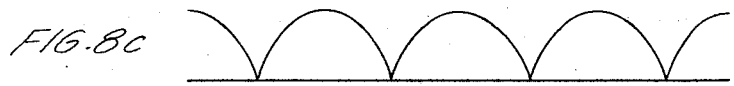
Figure 8D:
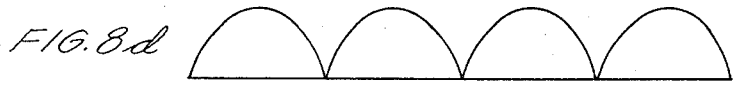
Figure 8E:
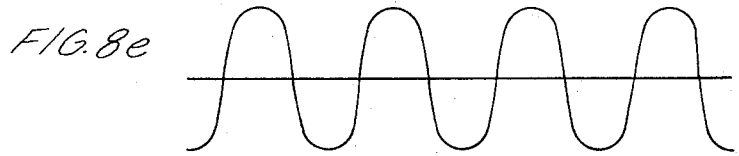
Figure 8F:
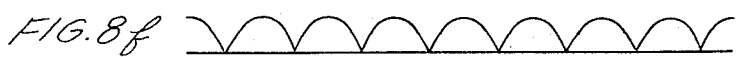
Figure 8G:

A major aspect of the present invention is the vector solution apparatus 44 which is illustrated in detail in FIG. 7. This apparatus provides a reasonably approximate solution of the in-phase and quadrature vector signals by means of a new algorithm. The mathematical expression for the vector solution of the quadrature-related signals is as follows:

$$G = E[\sin\theta] + E[\cos\theta] + .41 \ [E[\sin\theta] - E[\cos\theta]]$$

wherein the square brackets denote taking of the absolute value (which is achieved herein through full wave or parametric rectification), and wherein $G$ is the desired output magnitude, $E$ is the unknown signal amplitude, and $\theta$ is the phase angle between the unknown signal and the in-phase reference ($\phi$, on line 34). The relationship of the signals are illustrated in FIGS. 8a–8g which are assumed to be on a common time base. In FIG. 7, the quadrature related input signals $E\sin\theta$ and $E\cos\theta$ (FIGS. 8a and 8b, respectively) are applied on respective lines 40a, 42a from the adjustable low pass filters 40, 42 (FIG. 1) to related full wave or parametric rectifiers 120, 122. The output of these comprise $E$ times the absolute magnitude of the sine and cosine, respectively on related lines 124, 126, as illustrated in FIGS. 8c and 8d respectively. These signals are applied to a differential amplifier 128, the output of which comprises the difference between the two rectified waves as illustrated in FIG. 8 e. This is in turn rectified in a full wave or parametric rectifier 130 to provide the wave form illustrated in FIG. 8f, the output of which is scaled in a scaling device 132 such as an amplifier with a suitable gain, or an attenuator network, to comprise 0.41 of the input to provide a wave form as illustrated in FIG. 8f. This wave form is applied by a signal line 134 to a summing network 136 wherein the sum of the rectified inputs and a scaled function of the rectified difference of the rectified inputs is provided as the output signal, $G$, as illustrated in FIG 8g.

The empirical method of providing the approximate vector solution to quadrature related waves having substantially the same amplitude can be shown, through substitution in the equation, to provide a value of $G$ which is in fact not a strictly linear function of $E$, but to include an error which is a function of the angle $\theta$. For instance, by substitution into the equation, it can be shown that a minimum value of G of 1.41 E is obtained at 0° and at 45°, and that at 22½°, a maximum value of $G = 1.53E$ occurs. The deviation between the maximum and minimum values of $G$ (the range of error) is seen to be 8.4 percent, which may be considered to be an error of plus or minus 4.2 percent. The absolute excess (1.41 to 1.53) may be accommodated roughly by scaling $G$ by 0.68, as indicated by a scaling means 138 in FIG. 7. With the scaling factor of 0.68, at all angles wherein $G$ is in fact $1.47E$, the output will be extremely accurate. However, as indicated, the outputs will actually vary above and below this amount by up to a 4.2 percent error.

The controls utilized herein have not been shown in any great detail since such controls are well known and would unduly complicate the description hereof. However, it should be understood that the controls may comprise nothing more than panel switches, or other relatively simple controls. On the other hand, the multiplexers may be operated by counters, which counters determine which of a plurality of sensors or sources may be connected to have its frequency analyzed, or to be utilized in determining the frequency of the reference clock signals. Control over the adjustable filters similarly may be done manually, or by the output of counters which can be synchronized with multiplexing counters if desired. In addition, the signals and other controls may take the form of control words provided by a large scale digital computer in any application wherein the invention is utilized therewith, all as is well known in the art.

Thus there has been described, in accordance with various aspects of the present invention, a novel vector solution for quadrature-related signals, programmable aliasing filters in a frequency response analyzing equipment to eliminate interference with harmonics and other high order spurious signals, improved reference signal generating means including straight or countdown discrete timing references, analog timing references, and stepwise scanning frequency generation. And, although the various aspects of the present invention have been shown and described herein with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. A system for analyzing the frequency response of apparatus, comprising:
   a signal source for providing a signal having a complex wave form in which the amplitude of at least one frequency component of said complex wave form is indicative of a parameter related to said apparatus;
   a low pass filter having an adjustable high frequency breakpoint and connected to said source and responsive to said complex wave form signal to pass a related signal therethrough having substantially eliminated therefrom all frequency components in excess of the breakpoint of said low pass filter;
   means for generating a pair of quadrature-related reference signals at a given frequency at which the amplitude of a component of said complex wave form signal is desired to be determined;
   a pair of amplitude sensitive phase detectors connected to said reference signal generating means and to said low pass filter, each responsive to the output of said low pass filter and to a respective one of said quadrature-related reference signals, each of said phase detection means including low pass filter means respectively associated therewith for eliminating undesired high frequency components in the output wave form therefrom;
   vector solution means connected to both of said phase detector means and jointly responsive to the output signals therefrom to provide an output signal having a magnitude substantially related to the amplitude of the frequency component at said given frequency in said complex wave form signal, said vector solution means comprising:
   first and second full wave rectifiers, each responsive to a related one of said phase detectors;
   a difference amplifier connected to both of said full wave rectifiers and providing a signal relating to the difference between the output of said first rectifier and the output of said second rectifier;
   a third full wave rectifier connected to said difference amplifier for rectifying the output therefrom;
   scaling means responsive to the output of said third full wave rectifier for reducing the magnitude thereof; and
   summing means responsive concurrently to the output of said first and second full wave rectifiers and the output of said scaling means for providing said output signal.

2. The system according to claim 1 wherein said reference signal generating means comprises:
   means for generating a signal having a periodically increased magnitude in a stepwise fashion;
   a square wave voltage controlled oscillator; and
   means connected and responsive to the output of said voltage controlled oscillator for generating a pair of signals, one signal relating to half the frequency of the output of said voltage controlled oscillator and the other signal relating to the exclusive OR of the output of said voltage controlled oscillator and said one signal.

3. The system according to claim 2 wherein said periodically increased signal level generating means comprises:
   means including a periodically incremented counter; and
   a digital to analog converter responsive to said counter to provide a signal level input to said square wave voltage controlled oscillator as a function of the count manifested by said counter.

4. A system for analyzing the frequency response of apparatus, comprising:
   a signal source for providing a signal having a complex wave form in which the amplitude of at least one frequency component of said complex wave form is indicative of a parameter related to said apparatus;
   a low pass filter having an adjustable high frequency breakpoint and connected to said source and responsive to said complex wave form signal to pass a related signal therethrough having substantially eliminated therefrom all frequency components in excess of the breakpoint of said low pass filter;
   means for generating a pair of quadrature-related reference signals at a given frequency at which the amplitude of a component of said complex wave form signal is desired to be determined, said reference signal generator means comprising at least one analog timing sensor for providing a signal having a magnitude indicative of the rate of a cyclic event related to said parameter;

a pair of amplitude sensitive phase detectors connected to said reference signal generating means and to said low pass filter, each responsive to the output of said low pass filter and to a respective one of said quadrature-related reference signals, each of said phase detection means including low pass filter means respectively associated therewith for eliminating undesired high frequency components in the output wave form therefrom;

vector solution means connected to both of said phase detector means and jointly responsive to the output signals therefrom to provide an output signal having a magnitude substantially related to the amplitude of the frequency component at said given frequency in said complex wave form signal;

a square wave voltage controlled oscillator;

means interconnecting said voltage controlled oscillator with said analog timing sensor means, the frequency of output of said oscillator being a function of the magnitude of said signal from said analog timing sensor; and means connected and responsive to the output of said voltage controlled oscillator for generating a pair of signals, one signal relating to half the frequency of the output of said voltage controlled oscillator and the other signal relating to the exclusive OR of the output of said voltage controlled oscillator and said one signal.

* * * * *